(12) United States Patent
Venot et al.

(10) Patent No.: US 8,979,147 B1
(45) Date of Patent: Mar. 17, 2015

(54) KITCHEN TONGS

(71) Applicant: Mastrad, S.A., Paris (FR)

(72) Inventors: Marc Venot, Saint Ouen (FR); Mathieu Lion, Paris (FR)

(73) Assignee: Mastrad, S.A., Paris (FR)

( * ) Notice: Subject to any disclaimer, the term of this patent is extended or adjusted under 35 U.S.C. 154(b) by 0 days.

(21) Appl. No.: 14/099,687

(22) Filed: Dec. 6, 2013

Related U.S. Application Data

(63) Continuation-in-part of application No. 13/767,707, filed on Feb. 14, 2013, now abandoned.

(51) Int. Cl.
*A47G 21/10* (2006.01)
*A47J 43/28* (2006.01)

(52) U.S. Cl.
CPC .............. *A47J 43/283* (2013.01); *A47G 21/10* (2013.01)
USPC .......................................... 294/16; 294/99.2

(58) Field of Classification Search
USPC ................................ 294/3, 16, 99.2, 100, 218
See application file for complete search history.

(56) References Cited

U.S. PATENT DOCUMENTS

| | | | | |
|---|---|---|---|---|
| 840,380 | A * | 1/1907 | Savidge | 606/124 |
| 1,141,741 | A | 6/1915 | Wiseman | |
| 1,187,193 | A * | 6/1916 | Smith | 294/19.3 |
| 1,504,648 | A | 8/1924 | Skinner | |
| 2,042,985 | A | 6/1936 | Gardella | |
| 2,300,894 | A | 11/1942 | Hedquist | |
| 3,093,402 | A | 6/1963 | Sisson | |
| 4,728,139 | A | 3/1988 | Oretti | |
| 4,768,288 | A | 9/1988 | Culbertson | |
| 4,852,929 | A | 8/1989 | Shafir | |
| 5,054,835 | A | 10/1991 | Loechel | |
| 5,199,756 | A * | 4/1993 | Bartlett et al. | 294/16 |
| 5,486,029 | A | 1/1996 | Kobayashi | |
| 5,810,411 | A | 9/1998 | Major | |
| 6,131,977 | A | 10/2000 | Sacks | |
| D474,653 | S | 5/2003 | Stewart | |
| 7,216,910 | B2 | 5/2007 | Frauscher | |
| 7,261,348 | B1 | 8/2007 | Fried | |
| 7,448,660 | B2 | 11/2008 | Yamanaka | |
| 7,458,622 | B2 | 12/2008 | Tardif et al. | |
| 7,922,225 | B2 * | 4/2011 | Li | 294/3 |
| 2009/0212583 | A1 * | 8/2009 | Frank | 294/99.2 |
| 2011/0193364 | A1 | 8/2011 | Jossem | |

FOREIGN PATENT DOCUMENTS

| | | |
|---|---|---|
| CN | 2902077 | 5/2007 |
| FR | 2836357 | 8/2003 |
| JP | 2002000429 | 8/2002 |
| JP | 3171797 | 11/2011 |

OTHER PUBLICATIONS

Prior art internet images of tongs.

* cited by examiner

*Primary Examiner* — Dean Kramer
(74) *Attorney, Agent, or Firm* — Novak Druce Connolly Bove + Quigg LLP

(57) ABSTRACT

A pair of tongs having two arms including a pivotal engagement therebetween with a pin. Each arm includes a jaw displaced from the pivotal engagement. A locking sleeve includes a channel therethrough with opposed tracks to receive the pin. Stops limit movement of the locking sleeve on the arms. A closure at the end of the channel includes a cup engageable with the locking sleeve. The stop at the distal end of the channel includes an opening therethrough conterminous with the channel. Each arm also includes an outer profile curved inwardly toward the pivotal engagement across which the locking sleeve slides. The pivotal engagement includes oblong holes in the arms with a resilient element biasing the arms apart.

18 Claims, 2 Drawing Sheets

KITCHEN TONGS

This application is a continuation-in-part of U.S. patent application Ser. No. 13/767,707, filed Feb. 14, 2013, the disclosure of which is incorporated herein by reference.

BACKGROUND OF THE INVENTION

The field of the present invention is tongs principally used for food items.

Tongs have long been used to handle hot food items in a kitchen environment. Kitchen tongs, commonly referred to as a pair of tongs, frequently employ two arms pivotally attached to one another at one end and having jaws at the other. A resilient spring biasing the arms to an open position allows the user to conveniently compress the arms together to grip food items for manipulation and transport. A lock to retain the two arms closed together principally for purposes of storage has been found useful. Such locking mechanisms include simple rings which may be drawn along the arms of a pair of tongs away from the pivot until the arms are retained in close proximity.

SUMMARY OF THE INVENTION

The present invention is directed to a pair of tongs including pivotally engaged arms having jaws at one end and a pivotal engagement at the other. A locking sleeve having a channel therethrough is slidable onto the arms about the pivotal engagement to retain the arms together in a locked position.

In a first aspect of the present invention, a closure cooperates with the locking sleeve to prevent juices and other cooking liquids from migrating down the arms and flowing from the pivotal end of the tongs. The closure may be engageable for removal and cleaning and the locking sleeve helps to retain such liquids until cleaning.

In a second aspect of the present invention, the locking sleeve offers a flat surface perpendicular to a central axis for standing the pair of tongs vertically on a horizontal surface.

In a third aspect of the present invention, one or more tracks extend longitudinally in the channel of the locking sleeve. The track or tracks can cooperate with an extended pivot pin of the pivotal engagement to limit the extent of movement of the locking sleeve and prevent its complete separation from the pair of tongs. A stop may be provided at the other end of the channel adjacent the end closure and extending across the track or tracks. This position blocking the track or tracks prevents interference of the pivotal engagement end of the arms with the closure. The stop may be an annular element having an opening which is conterminous with the channel to avoid blocking food elements carried along by cooking liquids. This stop extends across the track or tracks to also limit movement of the locking sleeve.

In a fourth aspect of the present invention, an outer profile on each arm is curved inwardly toward the pivotal engagement across which the one end of the locking sleeve slides onto the arms. This profile cooperates with the locking sleeve to reduce the travel of the locking sleeve between fully open and fully locked positions to better accommodate placement of the channel closure.

In a fifth aspect of the present invention, the pivotal engagement of the arms of the tongs includes a pin and oblong holes in the arms to receive the pin. The arms are biased apart by a resilient element. The channel of the locking sleeve is slidable onto the arms with the arms compressed toward one another at the pivotal engagement. With the arms released at the pivotal engagement, the arms can retain the locking sleeve with the arms in an angular range of closed positions and the locking sleeve is retained in position as well.

As a further aspect of the present invention, any of the foregoing separate aspects may be combined to further advantage.

Accordingly, it is a principal object of the present invention to provide an improved pair of tongs. Other and further objects and advantages will appear hereinafter.

DETAILED DESCRIPTION OF THE PREFERRED EMBODIMENT

Figure 1:
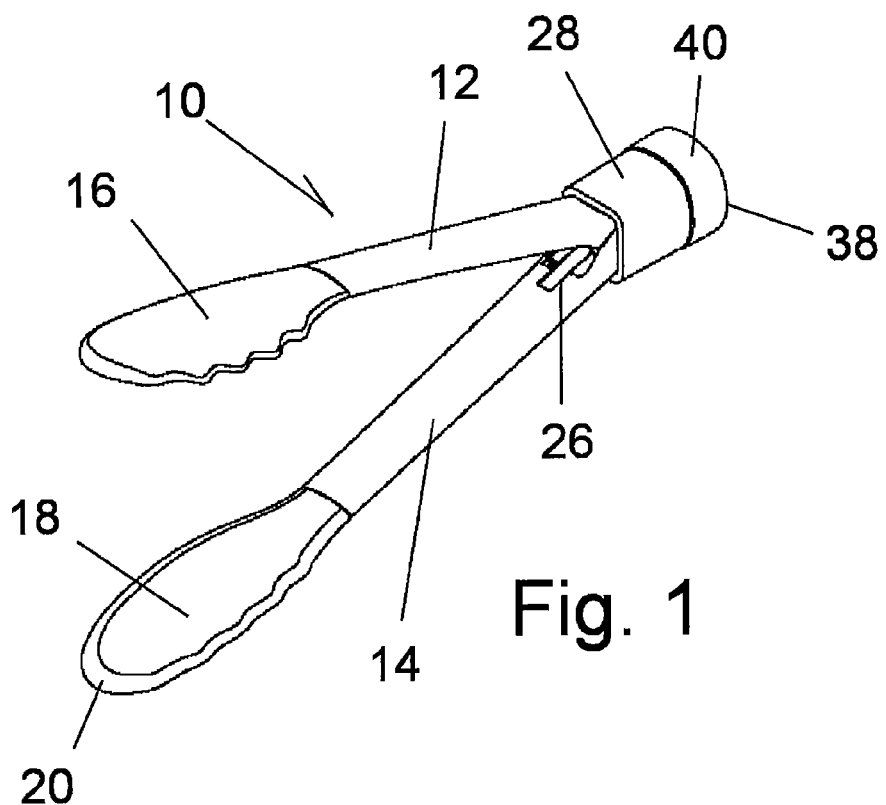
FIG. 1 is perspective view of a pair of tongs.
Figure 2:
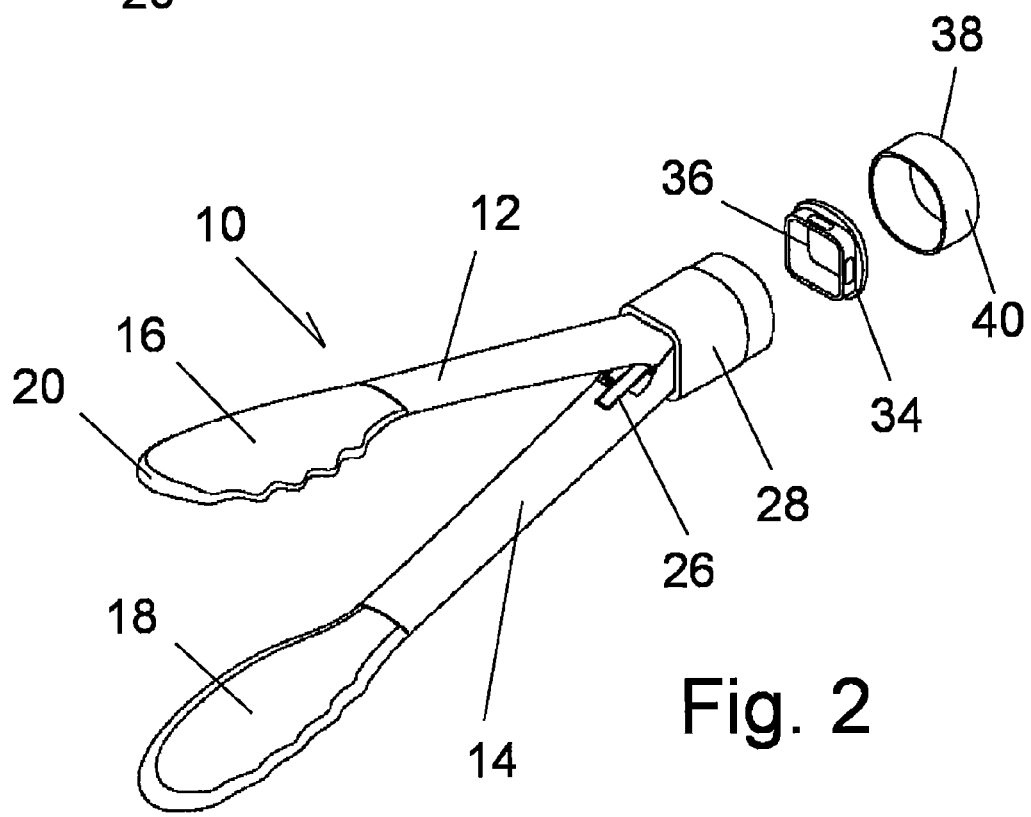
FIG. 2 is an exploded perspective view of the pair of tongs of FIG. 1.
Figure 3:
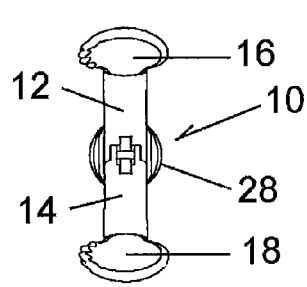
FIG. 3 is a front end view of the pair of tongs of FIG. 1.

Turning in detail to the Figures, a pair of tongs, generally designated 10, includes two elongate arms 12, 14 which are associated through a pivotal engagement at one end of the arms 12, 14. Jaws 16, 18 are located at the ends of the arms 12, 14 displaced from the pivotal engagement. These jaws are shown to be covered by temperature resistant silicone grips 20.

At the pivotal engagement, each arm 12, 14 includes two spaced apart lugs. The lugs 22 of arm 12 are nested inwardly of the lugs 23 of arm 14 with holes aligned to receive a pin 24 therethrough. The lugs 22, 23 with the pin 24 define the pivotal engagement. The arms 12, 14 and the lugs 22 are arranged in this preferred embodiment to have 2 mm gaps in the assembled pivotal engagement between elements to facilitate complete cleaning.

To bias the two arms 12, 14 toward the open position, a resilient element 26 is wrapped about the pin 24 and extends to engage the inside surfaces of the arms 12, 14. The element 26 is a formed plate spring including an arcuate mid section with radiating arms. The element 26 may be under some precompression with the radiating arms not fully released even with the pair of tongs in the fully open position.

A locking sleeve 28 is arranged at the pivot end of the pair of tongs 10. The locking sleeve 28 is slidable onto the arms about the pivotal engagement. A channel 30 extends fully through the locking sleeve 28. The locking sleeve 28 and channel 30 define a central axis through the tongs 10. The channel 30 in this embodiment is substantially square in cross section. The end of the channel 30 toward the arms 12, 14 operates to engage the outer surfaces of the arms 12, 14 to force them toward one another as the locking sleeve 28 is moved onto the arms 12, 14.

The outer surfaces of the arms 12, 14 curve inwardly toward the pivot. This outer profile allows a wider, fully open position of the arms without having to fully withdraw the locking sleeve 28 from around the pivotal engagement. It also reduces the length of relative movement employed between the locking sleeve 28 and the arms 12, 14 to fully lock the arms in a closed position. In turn, the closure at one end of the channel 30, described below, does not extend well beyond the pivotal engagement with the pair of tongs unlocked, which would otherwise be needed to accommodate a longer locking movement of the locking sleeve 28.

The locking sleeve 28 includes tracks 32 on opposed sides of the channel 30. These tracks 32 receive the ends of the pin 24. The tracks 32 do not extend fully to the end of the channel 30 toward the arms 12, 14. In this way a stop is created at one end of the tracks 32. The stop thus created prevents the locking sleeve 28 from being disassembled from the pivotally engaged arms 12, 14 by interfering with the ends of the pin 24 riding in the tracks 32.

The holes 33 in the lugs 22, 23 through which the pin 24 extends, defining the pivotal engagement, are oblong in cross section. The short dimension of these holes 33 is that of the diameter of the pin 24 with operative clearance. The long dimension of the holes 33 is preferably less than twice the diameter of the pin 24. This dimension is best determined empirically as the outer profile of each arm 12, 14 and the size of the channel 30 impact the amount of compression of the arms 12, 14 toward one another for optimal operation. The long dimension of each oblong hole 33 is oriented perpendicular to the elongate arm 12, 14 through which it extends.

An annular stop 34 is retained at the distal end of the locking sleeve 28. This annular stop 34 can be employed to prevent the two arms 12, 14 from moving too far through the channel 30. This stop 34 extends across the tracks 32 to engage the pin 24 moving in the tracks 32. The stop 34 is positioned to limit movement of the locking sleeve 28 to prevent interference of the pivotal engagement end of the arms 12, 14 with the closure, again, described below. An opening 36 is provided through the middle of the annular stop 34. This opening 36 preferably has a surface which is conterminous with the channel 30 to avoid food items and other substances from becoming hung up in the channel 30. Again in the preferred embodiment, the locking sleeve 28 can be moved relative to the arms 12, 14 to insure at least a 2 mm gap therebetween for cleaning purposes. The pin 24 may be more tightly constrained in the tracks 32; but it can be moved along the tracks 32 to facilitate cleaning.

The locking sleeve 28 can include a cup 38 to provide a closure at the end of the pair of tongs 10. This cup can slide over and close the channel 30 of the locking sleeve 28 with a resilient interfering fit and yet be removable for cleaning. The sidewall 40 of the cup 38 provides this resilience. The sidewall 40 also becomes the retainer of cooking liquids as the cup 38 is taken from the locking sleeve 28.

The locking sleeve 28 and/or the closure of the locking sleeve 28, defined in the preferred embodiment by the cup 38, may have a surface 42 in a plane perpendicular to the center axis of the locking sleeve 28. Such a surface 42 may be defined by the entire surface of the locking sleeve 28 or cup 38, an annular edge or raised portion thereon or even as little as three points in a triangular pattern all lying in a plane perpendicular to the center axis of the locking sleeve 28. This enables the pair of tongs 10 to be positioned vertically on a horizontal surface, advantageous for convenient manual purchase. The locking sleeve 28 and cup 38 can retain cooking liquids which flow down the tongs when in that vertical position.

Figure 5:
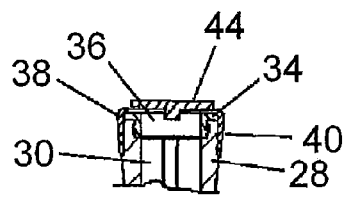
FIG. 5 is a cross-sectional detail view of the pair of tongs showing a second embodiment of the cap on the locking sleeve.
Figure 4:
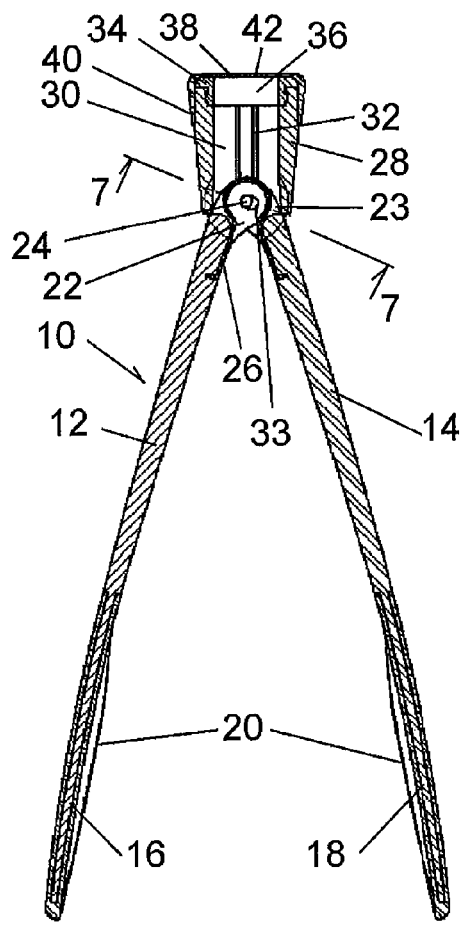
FIG. 4 is a cross-sectional view of the pair of tongs taken along the centerlines of the arms.
Figure 6:
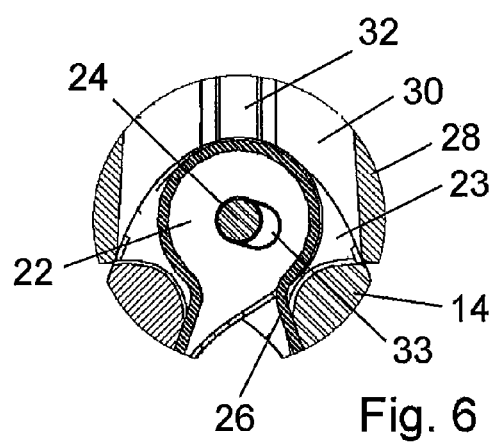
FIG. 6 is a cross-sectional detail view of the pivotal engagement.
Figure 7:
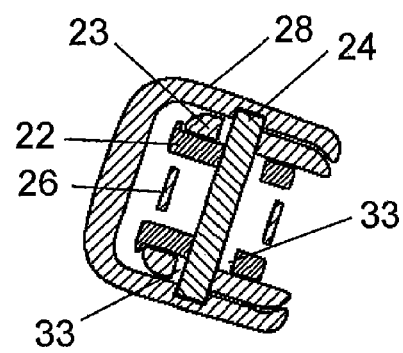
FIG. 7 is a cross-sectional view of the pivotal engagement taken along line 7-7 of FIG. 4.

In the alternative embodiment of FIG. 5, a plug 44 may be included to provide a controlled release of accumulated liquids from the channel 30 of the locking sleeve 28.

In operation, the tongs 10 may be stored with the locking sleeve 28 retaining the elongate arms 12, 14 together. The resilient element 26 forces the arms 12, 14 outwardly at the pivotal engagement against the locking sleeve 28 which retains the sleeve 28 in place even if the elongate arms 12, 14 are pinched together. To open the tongs, the arms 12, 14 may be pinched together at the pivotal engagement to release the locking sleeve 28. Of course, the locking sleeve 28 can be directly forced toward the end of the tongs 10 to release the arms 12, 14. To reverse the process, the arms 12, 14 can be pinched together at the pivotal engagement and the tongs 10 can be placed standing up on a horizontal surface. These operations are made possible by the oblong holes 33 accommodating the compressing of the elongate arms 12, 14 toward one another at the pivotal engagement. A user can easily grasp the closed tongs 10 resting vertically, open the tongs by squeezing the elongate arms 12, 14, employ the tongs 10 with the locking sleeve 28 held in the open position by the expanded arms 12, 14 under the bias of the resilient element 26 and then replace the tongs in rest position by squeezing the arms 12, 14 and setting the tongs down on the surface 42.

It also has been found that the tongs 10 will hold items at substantially all positions of the arms 12, 14 by advancing the locking sleeve 28 onto the arms 12, 14 with the arms compressed toward one another and then allowing the arms 12, 14 to expand apart under the bias of the resilient element 26 against the locking sleeve 28. The compression required increasing as the locking sleeve 28 advances onto the arms 12, 14. Again, this operations possible because of the degree of freedom provided by the oblong holes 33.

Thus, an improved kitchen pair of tongs has been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A pair of tongs comprising
two arms including a pivotal engagement therebetween, the pivotal engagement having a pin about which the two arms pivot relative to one another, each arm including a jaw displaced from the pivotal engagement;
a locking sleeve including a channel therethrough, the channel at one end being slidable onto the arms about the pivotal engagement, the locking sleeve further including at least one track in the channel receiving the pin and having a stop adjacent one end of the channel;
a closure including a cup engageable with the locking sleeve at a second end of the channel to form a cavity with the locking sleeve for retention of liquids.

2. The pair of tongs of claim 1 further comprising
an annular stop retained at the second end of the channel including an opening therethrough conterminous with the channel and extending across the at least one track at the second end of the channel.

3. The pair of tongs of claim 2, each arm further including an outer profile curved inwardly toward the pivotal engagement across which the one end of the locking sleeve slides onto the arms.

4. The pair of tongs of claim 1 further comprising
a resilient element between the arms biasing the jaws apart.

5. The pair of tongs of claim 1, the cup including a sidewall slidable onto the locking sleeve, the cup and the locking sleeve having a resilient interfering fit.

6. The pair of tongs of claim 1, the two arms defining a center plane therebetween, the closure including a plug in the cup, the closure having a surface perpendicular to the center plane to set the pair of tongs on end.

7. The pair of tongs of claim 1, the closure having a flat surface to set the pair of tongs on end.

8. The pair of tongs of claim 1, the two arms, the pivotal engagement and the channel of the locking sleeve having available spacing of no less than 2 mm between adjacent ones of the two arms, the pivotal engagement and the channel of the locking sleeve.

9. A pair of tongs comprising two elongate arms including a pivotal engagement therebetween adjacent a first end and jaws at a second end, the pivotal engagement including an oblong hole through each elongate arm and a pin extending through the oblong holes;

a resilient element between the elongate arms biasing the elongate arms apart, the elongate arms being compressible toward one another at the pivotal engagement;

a locking sleeve including a channel therethrough, the channel being slidable onto the elongate arms with the elongate arms compressed toward one another at the pivotal engagement.

10. The pair of tongs of claim 9, a long dimension of the oblong hole in each elongate arm extending perpendicular to the elongate arm.

11. The pair of tongs of claim 9, the jaws continually moving toward one another with advancement of the channel onto the elongate arms.

12. The pair of tongs of claim 9, each elongate arm further including an outer profile curved inwardly toward the pivotal engagement across which the channel slides onto the arms.

13. The pair of tongs of claim 9, the locking sleeve further including at least one track in the channel receiving the pin and having a first stop adjacent one end of the channel limiting outward rotation of the elongate arms.

14. The pair of tongs of claim 13, the locking sleeve further including a second stop extending across the at least one track at the second end of the channel retaining the elongate arms together.

15. The pair of tongs of claim 9, the channel defining a central axis, the locking sleeve further including a surface perpendicular to the center axis to set the pair of tongs on end.

16. The pair of tongs of claim 9, the locking sleeve further including a cup at a second end of the channel to form a cavity for retention of liquids.

17. A pair of tongs comprising two arms including a pivotal engagement therebetween, each arm including a pivot end adjacent the pivotal engagement and a jaw displaced from the pivotal engagement;

a locking sleeve including a channel therethrough, the channel at a first end being slidable onto the arms about the pivotal engagement, the channel defining a central axis, the channel engaging with the two arms to continually move the jaws toward one another with advancement of the channel onto the elongate arms beyond the pivotal engagement, a second end of the locking sleeve remaining displaced outwardly from the pivot end;

a surface perpendicular to the center axis at the second end of the locking sleeve to set the pair of tongs on end;

a resilient element between the elongate arms biasing the elongate arms apart, the pivotal engagement including an oblong hole through each elongate arm and a pin extending through the oblong holes, the elongate arms being compressible toward one another at the pivotal engagement.

18. A pair of tongs comprising two arms including a pivotal engagement therebetween, the pivotal engagement having a pin, each arm including a pivot end adjacent the pivotal engagement and a jaw displaced from the pivotal engagement;

a locking sleeve including first and second ends, a channel through the locking sleeve and the first and second ends and at least one track in the channel receiving the pin and having a stop to engage the pin, the first end being slidable over the arms at the pivotal engagement, the channel defining a central axis, the channel engaging with the two arms to continually move the jaws toward one another with advancement of the channel onto the elongate arms beyond the pivotal engagement, the second end remaining displaced outwardly from the pivot end;

a surface at the second end of the locking sleeve perpendicular to the center axis to set the pair of tongs on end.

* * * * *